S. W. GRAYSON.
ATTACHMENT FOR FRONT AXLES OF MOTOR VEHICLES.
APPLICATION FILED MAR. 10, 1916.
1,249,069.
Patented Dec. 4, 1917.
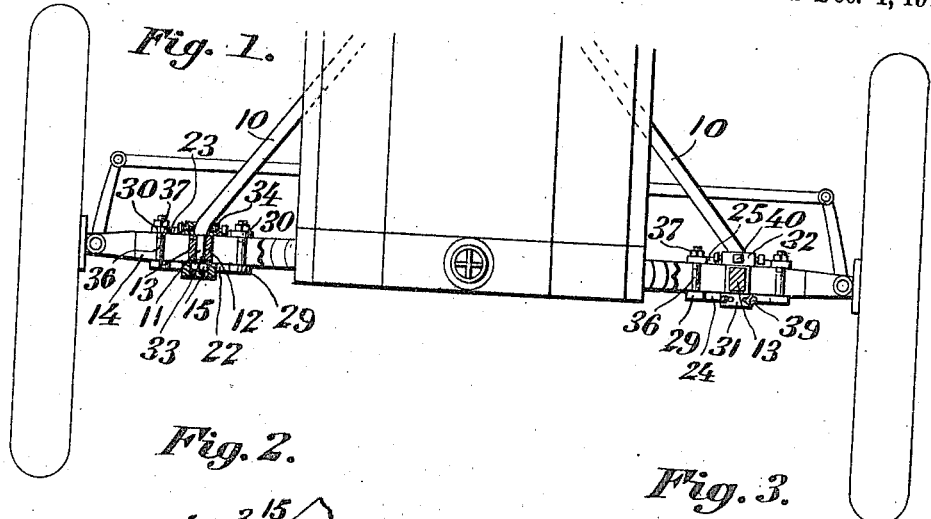
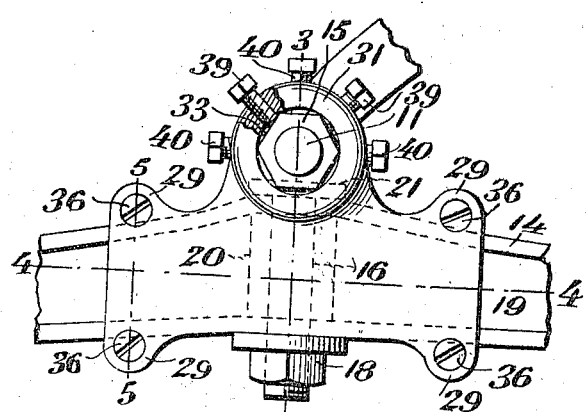
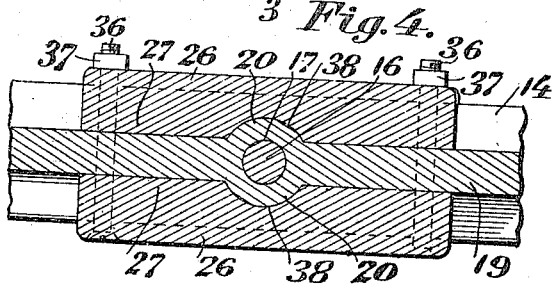
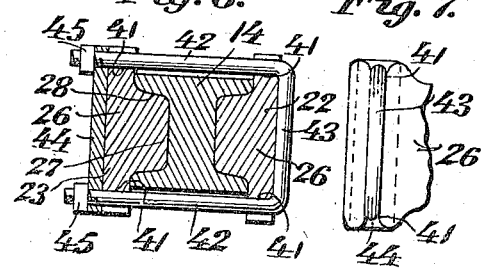
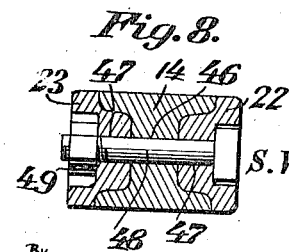
S. W. Grayson,
Inventor,
By Malcolm H. Gannett, Atty.

UNITED STATES PATENT OFFICE.

STEWART W. GRAYSON, OF SHARPSBURG, MARYLAND.

ATTACHMENT FOR FRONT AXLES OF MOTOR-VEHICLES.

1,249,069.      Specification of Letters Patent.      Patented Dec. 4, 1917.

Application filed March 10, 1916. Serial No. 83,322.

*To all whom it may concern:*

Be it known that I, STEWART W. GRAYSON, a citizen of the United States, residing at Sharpsburg, in the county of Washington and State of Maryland, have invented new and useful Improvements in Attachments for Front Axles of Motor-Vehicles, of which the following is a specification.

This invention relates to an attachment for front axles of motor vehicles, which is designed to strengthen said axle where the radius rods and spring-shackle bolts are connected thereto.

The prime object of the present invention is to provide means, in the form of a pair of oppositely arranged members, which are secured to the axle, the radius rods and spring-shackle bolt, which will eliminate the danger of said rods and spring-shackle bolt becoming detached from said axle.

Further objects will readily be apparent from the following detail description, taken in connection with the accompanying drawings, wherein is illustrated the preferred embodiment of my invention.

In the drawings:—

Figure 1, is a fragmentary plan view of the front portion of a motor vehicle, showing the application of my invention.

Fig. 2, is an enlarged elevation illustrating my improvement in detail.

Fig. 3, is a detail sectional view, taken on the line 3—3, of Fig. 2.

Fig. 4, is a horizontal sectional view taken on the line 4—4, of Fig. 2.

Fig. 5, is a detail sectional view taken on the line 5—5, of Fig. 2.

Fig. 6, is a view similar to Fig. 5, showing a slightly modified form of securing means.

Fig. 7, is a view in front elevation of the structure shown in Fig. 6, and

Fig. 8, is a sectional view showing a still further modified form of securing means.

In the manufacture of Ford motor vehicles, transverse spring suspension is utilized, and the front axle is secured to the chassis by a pair of radius rods. These rods and the ends of the front springs are fastened to the axle, adjacent the spindle-ends thereof, by a spring-shackle bolt which is pressed downwardly through the axle and normally lies in a vertical position. The radius rods which are approximately horizontal, have their forward ends bent inwardly, reduced slightly in diameter, and passed through a horizontal opening formed in the spring-shackle bolts immediately above the axle proper. The reduced outer ends of the radius rods are screw threaded and nuts are secured to these ends to normally hold these rods in firm engagement with the axle. The purpose of these radius rods is to prevent a twisting movement of the front axle when the motor vehicle is in motion, thereby increasing the stability of the steering mechanism, which is, as usual, fastened to the front axle.

In actual practice it has been found when driving the motor vehicle over exceedingly rough roads, or through deep mud, the strain imparted to the radius rods is such, that one often breaks or snaps off, at the point to which it is secured to the spring-shackle bolt, and in frequent cases the latter breaks when it is secured to the front axle. When this occurs, it causes the front axle to swing away from the vehicle, thereby disabling the steering mechanism to such an extent that control of the vehicle is lost and the lives of the occupants are endangered.

Referring to the drawings, wherein like reference numerals denote corresponding parts in all the views, I have illustrated the usual form of structure employed in assembling the above-mentioned elements during the process of manufacturing the Ford motor vehicle.

The radius rods 10 have their ends 11, slightly reduced in diameter and screw-threaded. These ends are bent inwardly and pass through the horizontal openings 12, formed in the spring-shackle bolts 13, at right angles to the axle 14, and nuts 15 are screwed on the extremity thereof and tend to firmly secure said radius rods with the spring-shackle bolts 13. Shanks 16 depend from the spring-shackle bolts 13 and pass downwardly through the vertical openings 17 formed in the axle 14, as shown, and nuts 18 secure said bolts to said axle. Immediately above the shanks 16, the bolts 13 have formed thereon bosses 21, which engage the upper surface of the axle. The web 19 of the axle is provided with enlarged portions 20, and it is through these portions that the openings 17 are formed.

My invention consists of two sets of oppositely arranged members, which are constructed to conform to the shape of the axle 14 above described, where the radius rods 10 and the spring-shackle bolts 13 are joined thereto. I have illustrated the precise outline of the axle to which my device is applied and it will be seen that the outer end, or steering knuckle portion of said axle, tapers downwardly from the spring-shackle bolt 13. Therefore, I have found it desirable to utilize four members 22, 23, 24 and 25, the members 22 and 23, being one set and designed to be applied to one end of said axle, while the members 24 and 25 are the other set and are applied to the opposite end of said axle. As both sets are similar in construction, a description of one will suffice for the other.

I will now proceed to describe the application of the preferred embodiment of my invention to the axle 14. The member 22 is the outer member, while the member 23 is the inner member. These members are preferably constructed from a casting of iron, steel or any other suitable material, and comprise a body portion 26, having an enlargement 27 for engagement with the channels 28 formed in the axle 14, which axle is of the usual I-beam construction. Oppositely arranged pairs of ears 29 and 30 and upwardly extending enlarged portions 31 and 32 are formed integral with the body portions 26.

The enlarged portions 31 and 32 are provided with alining openings 33 and 34, the opening 33 surrounding the nut 15, while the radius rod 10 passes through the opening 34. These openings are of a size to snugly engage the nut 15 and the radius rod 10 respectively, the object being to prevent all lateral movement of the latter parts, should the spring-shackle bolt or the radius rod become broken or disengaged from the axle 14. By referring to Fig. 3, the portions 31 and 32 of the members 22 and 23 respectively, snugly engage the bolt 13. Thus should the nut 18 become disengaged from said bolt these members will prevent the bolt from being withdrawn from the axle.

Now, in order to securely attach the members 22 and 23 to the axle 14, I provide the ears 29 and 30 with alining openings 35, through which are adapted to be passed bolts 36, the heads of said bolts being seated in the outer member, while nuts 37 bear against the inner member, as shown. This arrangement tends to give the device a neat appearance as seen from the front. The members 22 and 23, thus secured, are prevented from any movement whatsoever with respect to the axle 14, by reason of the fact that the bolts 36 firmly clamp the members to the side walls of the axle, while the enlargements 27 formed on the body portions 26 engage in the oppositely arranged channels 28 of the axle 14. Recesses 38 for engagement with the portion 20 of the web 19, as shown in Fig. 4 of the drawings, permit of snug engagement of the members with the axle. This structure also prevents all lateral movement of the relative parts and the members are thereby in keyed relation with the axle.

Set screws 39 are passed through suitable threaded openings in the portion 31 of the front member 22, and engage the nut 15, while similar set screws 40 are passed through threaded openings in the portion 32 of the rear member 23 and engage with the radius rod 10 adjacent the spring-shackle bolt 13.

Now, should either the nut 18 become disengaged from the shank 16 of the spring-shackle bolt 13 or the same become fractured in any manner, the members 22 and 23 will prevent separation of the spring-shackle bolt from the axle. Likewise, the set-screws 39 prevent the nut 15 from becoming disengaged from the end 11 of the radius rod 10, while the set-screws 40 will retain the radius rod in position should the same become fractured adjacent the spring-shackle bolt 13. It may be mentioned that the radius rod 10 is somewhat weak at the point shown at $a$, Fig. 3, and often when the vehicle is moving, over exceedingly rough places, jolts cause said rod to snap.

In Figs. 6 and 7 of the drawings, I have shown a slightly modified form of securing means. In lieu of the bolts 36 above referred to, the members 22 and 23 are provided with notches 41 adapted to receive the legs 42 of a U-shaped bolt 43, the legs being passed through openings in a plate 44 and nuts 45 are secured thereto.

In Fig. 8, I have shown an opening 46 formed in the axle 14 and alining with opening 47 in the oppositely arranged members 22 and 23. A bolt 48 is passed through these openings and a nut 49 is screwed thereon. In this instance the ears 29 and 30 are omitted; otherwise the structure is the same as above described.

In attaching my device, I remove the nut 15 from the end 11 of the radius rod 10. The latter is then withdrawn from the opening 12 of the spring-shackle bolt 13 a sufficient distance to permit the member 23 being inserted therein. In this operation, the reduced end of the radius rod is passed through the opening 34 formed in the enlarged portion 32 of said member. The radius rod is then replaced in the spring-shackle bolt and the nut 15 secured thereon.

The outer member 22 is then slipped into position, the opening 33 thereof engaging the nut 15 and surrounding the same, as shown on Fig. 3. Both members are now drawn toward each other, until the enlarged portions 27 thereof engage with the axle; then the bolts 36 are passed through the alining openings 35 and the nuts 37 tightly screwed in position. During this operation the set screws 39 and 40 may either be entirely removed from the enlargements 31 and 32 respectively, or else unscrewed sufficiently to permit the members 22 and 23 to readily be positioned. When, however, these members have been secured to the axle, the set screws are tightened, thereby completing the operation.

From the foregoing it will be seen that I have provided an exceedingly simple device which will prevent undue strain being imparted to the radius rod, spring-shackle bolt and axle, where they are joined, when the motor vehicle is moving over rough roads or strikes an obstruction, as often occurs. It is to be understood, however, that I am not limited to the precise form of device shown, and that various changes may be made in the form and proportion of the various elements, without departing from the spirit of the following claims.

Having thus described my invention, I claim:—

1. The combination with a vehicle axle having a radius rod and spring-shackle bolt secured thereto of reinforcing means embracing the said axle at the point of connection with the radius rod and spring-shackle bolt said reinforcing means being secured to said axle, said radius rod and said spring-shackle bolt.

2. The combination with the axle of a vehicle having connected thereto a radius rod and spring-shackle bolt, of reinforcing means therefor comprising a pair of oppositely arranged members embracing the said radius rod and spring-shackle bolt at the point of connection with the said axle and acting as a reinforcement for the radius rod, spring-shackle bolt and the axle.

3. The combination with a vehicle axle having a radius rod and spring-shackle bolt secured thereto, of a pair of oppositely arranged clamping members engaging in keyed relation with said axle and secured to said radius rod and said spring-shackle bolt.

4. The combination with the axle of a vehicle having a radius rod and spring-shackle bolt secured thereto, of reinforcing means therefor comprehending elements engaged in keyed relation with the axle, radius rod and spring-shackle bolt, and means holding said elements relative to each other.

In testimony whereof I have hereunto set my hand this 9th day of March, 1916.

STEWART W. GRAYSON.

Copies of this patent may be obtained for five cents each, by addressing the "Commissioner of Patents, Washington, D. C."